United States Patent [19]

Deem

[11] 4,334,559

[45] Jun. 15, 1982

[54] PIPE COUPLING

[76] Inventor: Larry D. Deem, 8619 Furnace Rd., Vermilion, Ohio 44089

[21] Appl. No.: 159,218

[22] Filed: Jun. 13, 1980

[51] Int. Cl.³ .............................................. B65B 3/04
[52] U.S. Cl. ................................. 141/346; 141/311 R; 141/383; 231/263
[58] Field of Search ................... 141/192, 193, 311 R, 141/346–350, 383; 251/263

[56] References Cited

U.S. PATENT DOCUMENTS 2,880,765  4/1959  Pugsley et al. ..................... 141/193

Primary Examiner—Frederick R. Schmidt
Attorney, Agent, or Firm—Allen D. Gutchess, Jr.

[57] ABSTRACT

A coupling is provided for connecting a lance pipe to an oxygen supply line. The lance pipe supplies oxygen to molten metal in a furnace and is fed thereinto longitudinally by feed rolls as the end of the pipe burns off. The coupling automatically closes a supply valve in the supply line and then disconnects the line from the lance pipe as the trailing end of the pipe reaches the feed rolls of the furnace.

20 Claims, 9 Drawing Figures

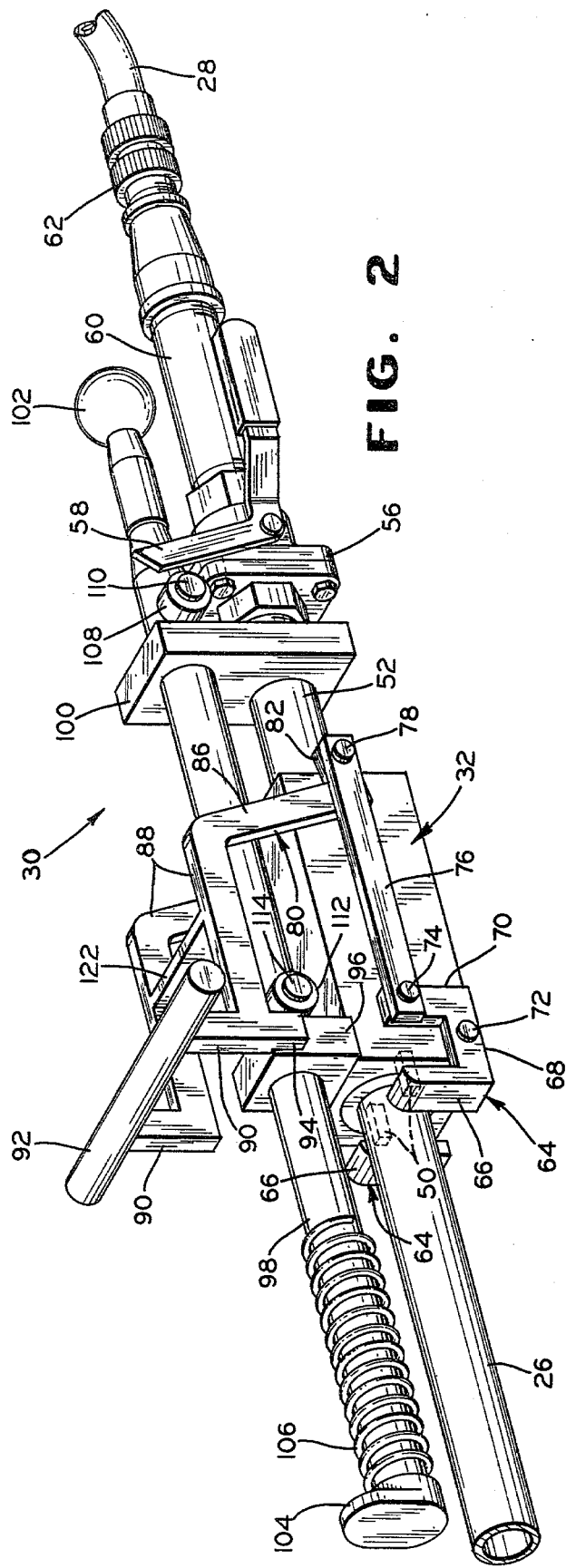
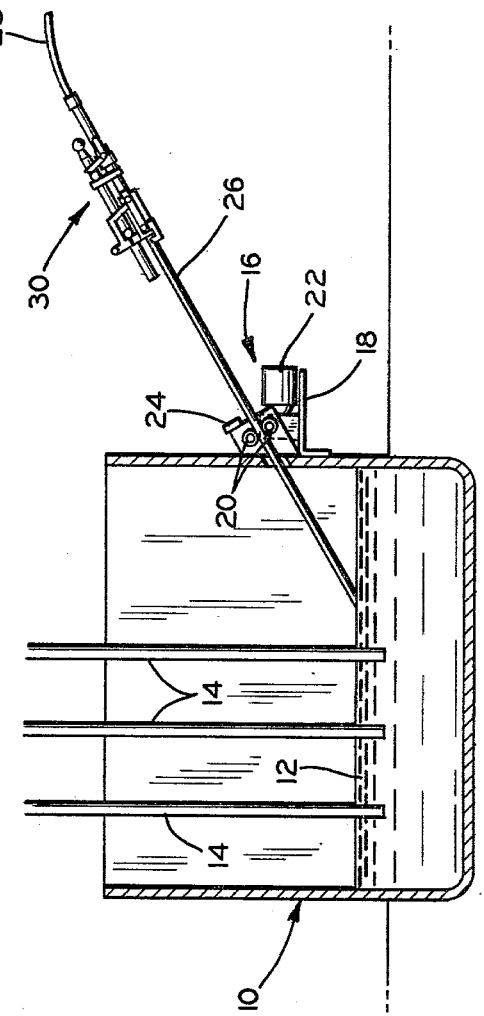
FIG. 2
FIG. 1

PIPE COUPLING

This invention relates to a coupling for connecting a fluid supply line to a longitudinally-moving pipe.

In a steel melting furnace, an oxygen lance pipe supplies oxygen into the molten metal below slag floating thereon. Feed rolls in a side wall of the furnace feed the pipe longitudinally as the end in the molten metal burns off. When the pipe is used up, an oxygen supply line must be disconnected so that a new lance pipe can be employed. Heretofore, this has been accomplished manually and has been a substantial problem. The remaining portion of the pipe cannot be backed up through the feed rolls because the end portion of the pipe is hot and would jam in the feed rolls. In some instances, the flow of oxygen was stopped and the end portion of the pipe was allowed to heat to a higher temperature. The oxygen was then turned on again briefly, which would cause the end portion of the pipe to burn off. The remainder of the pipe could then be backed up through the feed rolls and uncoupled. More recently, water cooled panels have been employed around the steel melting furnaces in place of the usual refractories. The aforementioned practice could then result in burning holes through the water cooled panels when the lance pipe was backed up.

The present invention provides a lance pipe coupling which automatically turns off the oxygen valve in the supply line as the trailing end of the pipe approaches the feed rolls at the furnace wall. The coupling then automatically is disconnected from the end of the pipe which continues to be fed through the feed rolls and drops into the furnace. The coupling then falls away and is ready for attachment to another lance pipe.

The lance pipe coupling includes a sealing body or housing which receives an end of the lance pipe. An oxygen supply line is connected to the end of the housing opposite the lance pipe, with the supply line having a valve therein with a handle extension. The connected end of the pipe has transversely-extending portions or lugs which are engaged by engaging hooks pivotally mounted on the housing and connected to linkages for engaging the hooks with and disengaging them from the lugs on the pipe. An actuator rod is slidably carried by the housing and moves with it until engaging a stationary object adjacent the feed rolls. The actuator rod is then forced rearwardly relative to the housing as the pipe continues to move and first engages the handle extension of the valve, causing the valve to close. Further rearward movement of the actuator rod causes it to engage the linkages and disengage the hooks from the lugs on the pipe. The pipe then continues to be moved by the feed rolls into the furnace with the coupling being disconnected and separated and ready to receive another pipe. The coupling also has a safety latch which prevents the coupling from being manually uncoupled from the lance pipe until the supply valve is closed.

It is, therefore, a principal object of the invention to provide a coupling for connecting a longitudinally-movable pipe to a line and for automatically disconnecting the line from the pipe.

A further object of the invention is to provide a coupling for connecting an oxygen supply line to a longitudinally-movable lance pipe and for shutting off a valve in the oxygen line and disconnecting line from the pipe when the pipe reaches a predetermined position.

Many other objects and advantages of the invention will be apparent from the following detailed description of preferred embodiments thereof, reference being made to the accompanying drawings, in which:

FIG. 1 is a schematic view in perspective of an electrically-heated, steel-melting furnace with a coupling according to the invention connecting a lance pipe and a supply line;

FIG. 2 is an enlarged view in perspective of the coupling according to the invention shown with a portion of the lance pipe and the supply line;

Figure 3:
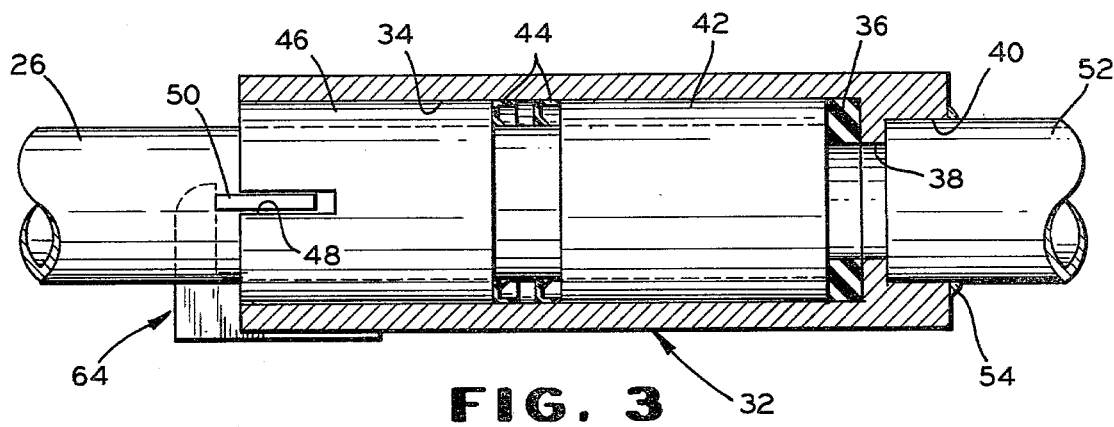
FIG. 3 is a view in longitudinal cross section taken through a sealing body or housing of the coupling.

Referring to FIG. 1, an electrically-heated steel melting furnace is indicated at 10, melting a pool 12 of steel therein by electrodes 14. A power feed roller assembly indicated at 16 is mounted on a side wall of the furnace 10. The assembly includes a support 18 mounted on the side wall and rotatably carrying power feed rolls 20 which are driven by a motor 22. A stationary object or member 24 is mounted on the support 18 above the feed rolls 20.

An oxygen pipe 26 travels between the feed rolls 20 with the leading end extending through slag on the molten metal and into the molten pool 12. The lance pipe 26 is of substantial length, typically being twenty-one feet long. The pipe is fed longitudinally into the furnace, as the leading end burns off, by the feed rolls 20 and will last for a period of time from about one-half hour to as much as four hours, depending upon the conditions. Oxygen is supplied through the pipe 26 by a supply line 28 which must be connected to the trailing end of the pipe 26 and subsequently disconnected therefrom as the trailing end approaches the feed rolls 20. This has often been a problem, as discussed previously.

The present invention provides a lance pipe coupling 30 which automatically disconnects the lance pipe and supply line as the trailing end of the pipe approaches the feed roll assembly 16. Referring to FIGS. 2 and 3, the lance pipe coupling 30 includes a sealing body or housing 32 having a cavity 34 to receive the trailing end of the lance pipe 26. The inner end of the cavity 34 has a seating ring 36 positioned around a central passage 38 and a bore 40. Adjacent the seating ring 36 is a spacer sleeve 42 extending about half way along the cavity 34. Adjacent the sleeve 42 are two flexible annular seals 44. Toward the open end of the cavity 34 is a receiving sleeve 46 having diametrically-opposite end notches 48.

The trailing end of the lance pipe 26 is received in the open end of the cavity 34 and seats against the seating ring 36. The pipe is held in alignment with the housing 32 by the sleeves 42 and 46. The trailing end portion of the pipe has engagable means in the form of two transversely-extending portions or lugs 50 which are received in the notches 48 of the receiving sleeve 46.

At the opposite end of the housing 32, a supply pipe or nipple 52 is affixed by weld or braze metal 54. The other end of the nipple 52 is threaded into a valve 56 which is commercially available, except for having a modified handle extension 58. The valve 56 is shown open in FIG. 2 and closed in FIGS. 4 and 5. A rear pipe nipple 60 is threaded at both ends and connects the valve 56 with a suitable coupling 62 which connects with the flexible oxygen supply line 28. When the valve 56 is open, oxygen is supplied from the flexible supply line 28 to the housing 32 and into the lance pipe 26. When the valve 56 is in the closed position, this flow is stopped.

Figure 4:
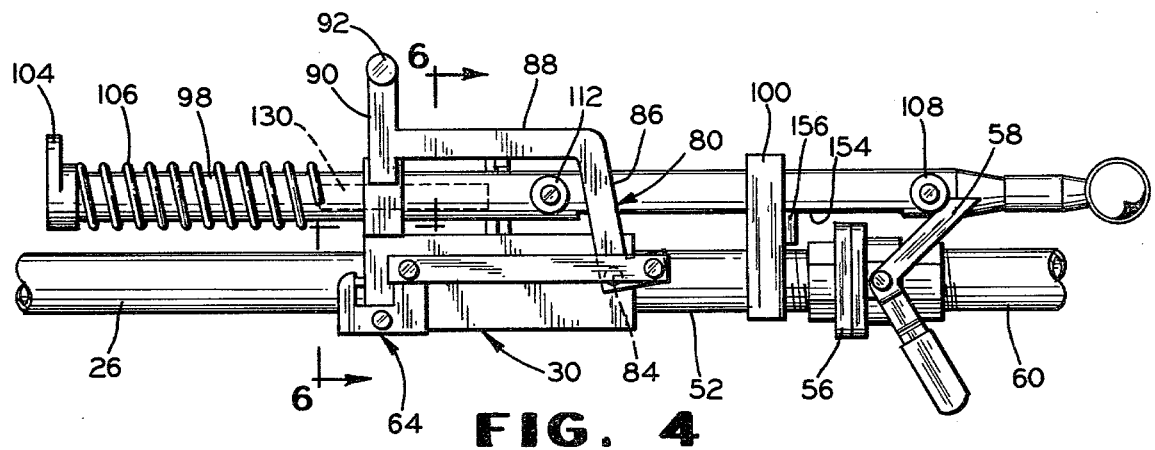
FIGS. 4 and 5 are side views in elevation of the coupling of FIG. 2 with components thereof shown in different sequential positions.

The lance pipe 26 is held in the housing 30 by engaging means carried by the housing and engagable with the engagable means or lugs 50 on the pipe 26. The engaging means shown include hook members 64 having thick hook legs 66 engagable with the lugs 50, an intermediate pivoted web 68, and a rear extension 70. The hook members are pivoted to the housing 30 by suitable pivot pins 72. The upper ends of the extensions 70 are pivotally connected by pins 74 to intermediate elongate links 76 extending substantially the length of the housing 30. The rear ends of the links 76 are pivoted by pins 78 to overcenter links 80. Specifically, the intermediate links are connected to overcenter link extensions 82 which are pivoted to the housing 30 by pivot pins 84. These are spaced forwardly of the pins 78 and slightly below a center line between the pivot pins 74 and 78. This provides a secure engagable connection between the coupling and the pipe 26 when the linkages are in the position of FIGS. 2 and 4. The overcenter links 80 also include upright arms 86 having lower ends connected to the extensions 82 and having upper ends connected to forwardly-extending arms 88. The forward ends of the arms 88 are structurally integral with upright extensions 90 terminating in a transverse handle 92. One of the extensions 90 also has a downward extending flange 94 which contacts a slide block 96 to determine the engaged position of the hook members 64 and the linkages 76 and 80. The engaged position of these components is shown in FIGS. 2 and 4, with the hook members 64 firmly engaged with the lugs 50 on the lance pipe 26.

An operating rod or member 98 is slidably carried by the block 96, which is mounted on the housing 32, and by a slide block 100 which is affixed to the pipe nipple 52. The operating rod 98 has a knob 102 at the rear end by means of which the position of the rod can be manually manipulated. At the forward end, the rod 98 has a contact shoe 104 and a return spring 106. A rear intermediate portion of the operating rod 98 has a first engaging member or roller 108 extending transversely from the rod and rotatably mounted on a stub axle 110. At a forward intermediate portion of the rod 98 is a second engaging member or roller 112 extending outwardly from the rod 98 in the same peripheral position as the roller 108 and is rotatably mounted on a stub axle 114.

The operation of the lance pipe coupling 30 will now be described. In FIG. 2, the lance pipe 26 is engaged in the coupling 30 and the flexible supply line 28 is connected thereto, which is always the case. The valve 56 is now open with the extension 58 extending upwardly. Thus, oxygen is supplied from the line 28 through the pipe 26 and into the furnace as the pipe 26 moves inwardly between the power feed rolls 20. This condition exists until the operating rod 98, and specifically the shoe 104 thereof engages the stationary member 24 adjacent the rolls. The operating rod 98 then moves rearwardly and, when reaching the position of FIG. 4, the roller 108 engages the handle extension 58 and closes the valve 56.

Figure 5:
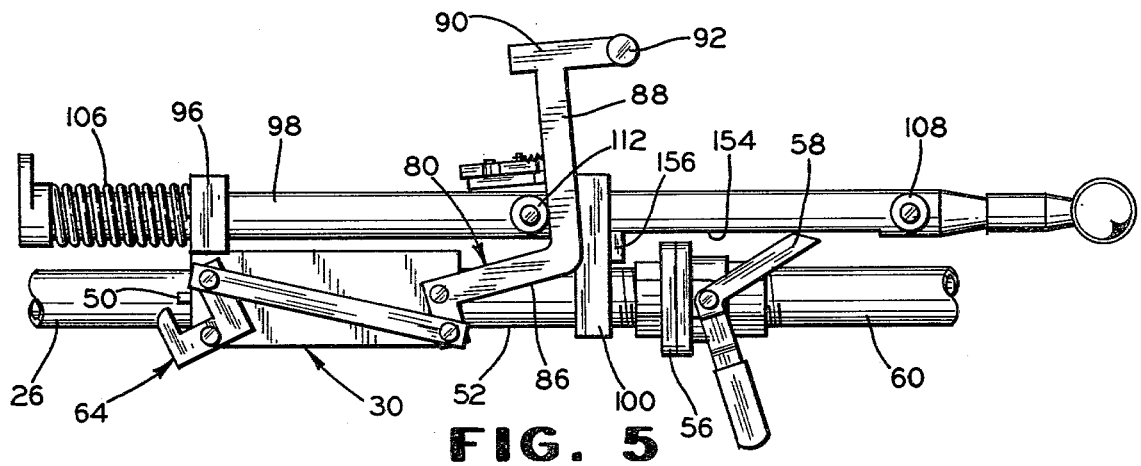

With additional forward movement of the lance pipe 26, the second roller 112 engages the upright arm 86 of the linkage 80 as the operating rod 98 moves further rearwardly. The roller then engages the arm 88, as shown in FIG. 5, to move the hook 64 members completely clear of the lugs 50. The feed rolls 20 then continue to move the pipe 26 forwardly to extract the trailing end of the pipe from the cavity 34 of the housing 32 with the movement of the pipe continuing until it drops into the furnace. The coupling 30 then falls away and can be connected to the next lance pipe with minimum time and trouble.

Figure 6:
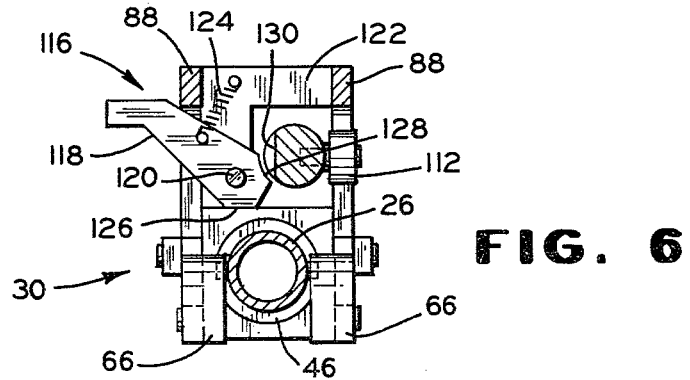
FIG. 6 is a view in transverse cross section taken along the line 6—6 of FIG. 4.

It may be noted from the above operation that the valve 56 is closed before the hook members 64 are disengaged from the pipe lugs 50. This assures that the oxygen will not escape into the atmosphere around the furnace. To prevent an operator from manually disconnecting the lance pipe 26 from the coupling 30 with the valve 56 open, a safety latch assembly 116, shown in FIG. 6, can be employed. The latch assembly includes a generally triangularally-shaped latch member or plate 118 pivotally supported through a pin 120 from a supporting plate or bracket 122 which extends between the arms 88 of the linkages 80. The latch plate 118 is urged in a clockwise direction by a spring 124, with a lower straight edge 126 of the latch plate abutting the top surface of the housing 30. In this position, a curved forward edge 128 clears the operating rod 98. However, if the rod is in a position such that the valve 56 is open, and if an operator were to grasp the handle 92 to raise the linkage 80 to disengage the hook members 64 from the lugs 50, the curved edge 128 of the latch plate 118 would interfere with the operating rod 98 and prevent such disengagement. However, if the operating rod 98 is moved sufficiently rearwardly to close the valve 56, then a clearance portion, shown as a flat recessed portion 130 on the side of the operating rod 98, will be positioned in alignment with the latch plate 118. In that instance, the handle 92 can be used to raise the linkages and disengage the lance pipe manually, with the curve edge 128 clearing the flat recess 130 on the rod.

Figure 7:
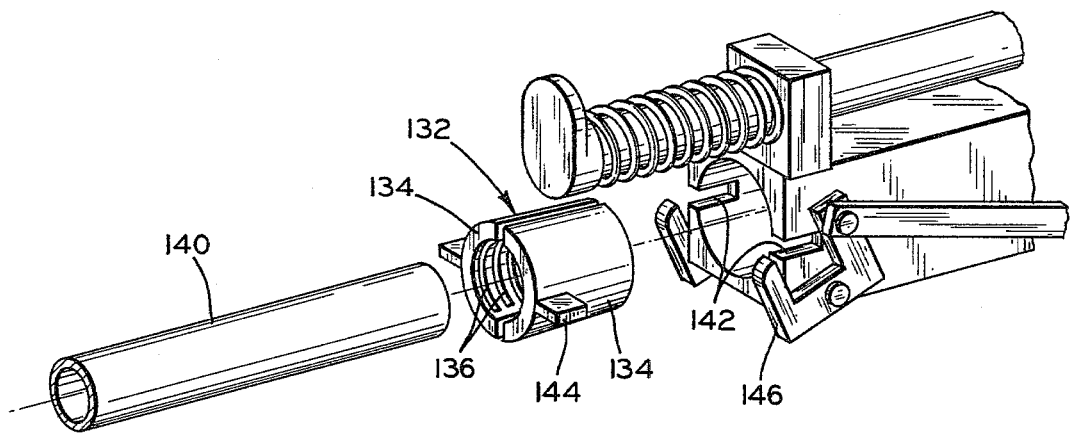
FIG. 7 is a fragmentary view in perspective of the pipe coupling with a modified pipe connection.
Figure 8:
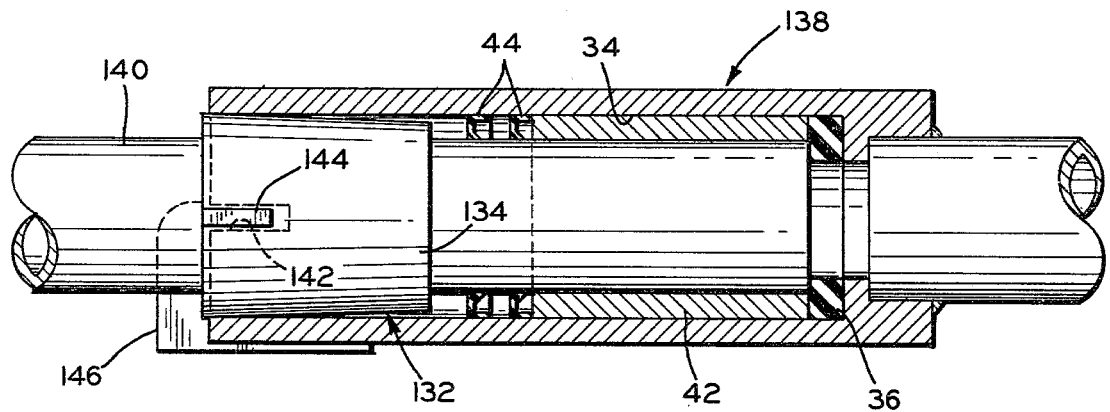
FIG. 8 is a view in longitudinal cross section taken through the coupling housing and pipe connection of FIG. 7, when in assembled relationship.

Other engagable means beside the transversely-extending portions or lugs 50 can be employed. Referring to FIGS. 7 and 8, a collet 132 can be used as the engagable means. The collet 132 includes two halves 134 which have tapered outer surfaces and inner ridges 136. The largest diameter of the collet exceeds the diameter of the cavity 34 of a slightly modifies sealing body or housing 138 so that when a slightly modified lance pipe 140 is inserted through the collet 132 and into the cavity 34, the collet halves 134 are clamped against the pipe 140 to hold it in position. The housing 138 is the same as the sealing housing 32 except for notches 142 at the open end of the cavity to receive lugs 144 on the collet halves 134. The lance pipe 140 is the same as the lance pipe 26 except that no lugs are welded directly thereto. The lugs 144 extend outwardly beyond the sides of the housing 138. Consequently, thinner hook legs 146 can be employed in place of the hook legs 66 of the hook members 64. The main advantage of using the collet 132 is that the lugs 50 need not be affixed to the trailing end of each of the lance pipes employed.

Figure 9:
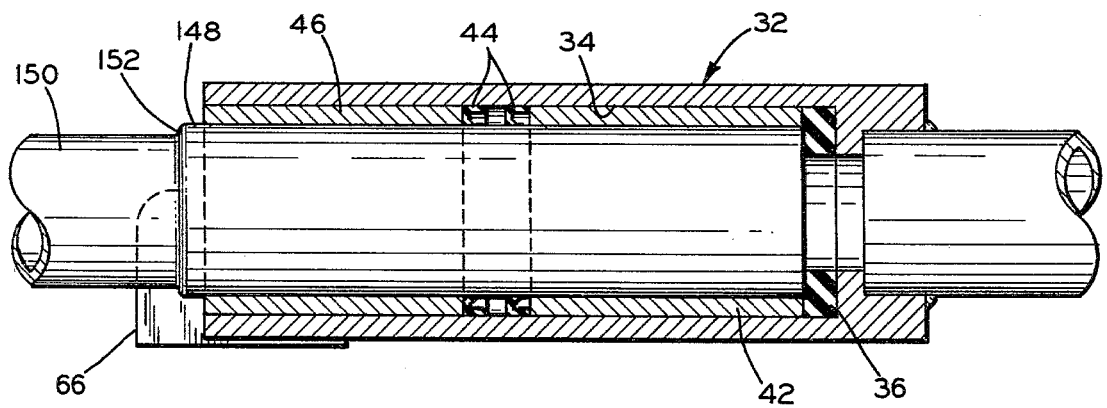
FIG. 9 is a view similar to FIG. 8 of a further modified pipe connection.

Engagable means in the form of an enlargement 148 on a lance pipe 150 which forms a transversely-extending annular shoulder 152 can also be employed, as shown in FIG. 9. In this instance, the thicker hook legs 66 are employed to engage the annular shoulder 152. Also, the same sealing housing 32 and the same cavity 34 along with the sleeves and seals 42, 46, and 44 can be employed.

Referring to FIGS. 4 and 5, the operating rod 98 can employ a flat recess 154 on the bottom which cooperates with a wear plate 156 on the block 100 to prevent the rod from rotating. The flat recess 130 could also be used for this purpose, if extended, and a wear plate were employed on the block 96.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. In combination, a pipe for supplying fluid, a first end of said pipe being subject to burning off, means for moving the pipe longitudinally along a predetermined path, a coupling comprising a housing for receiving a second end of said pipe, means carried by the housing for connecting said housing to said pipe, said connecting means having a first position in which said housing is connected to the pipe and a second position in which the pipe is releaseable from said housing, said housing moving with said pipe when connected thereto, a valve, operating means connected with said valve for opening and closing said valve, said valve being opened when said operating means is in a first position and said valve being closed when said operating means is in a second position, said valve being connected to and moveable with said housing and communicating with an end of said housing opposite said pipe for supplying fluid through the housing to the pipe when the valve is opened, an operating member moveably carried by said housing and moveable rearwardly from a forward position when engaging a stationary object as the pipe is moving along the predetermined path, said operating member having means for engaging said valve-operating means when moving rearwardly to move said operating means from the first position to the second position to close said valve, and said member having additional means for engaging said connecting means for moving said connecting means from the first position to the second position for releasing said pipe from said housing when said valve is closed.

2. The combination according to claim 1 wherein said valve-operating means is a handle extension, and said engaging means and said additional means on said member are projections extending transversely therefrom.

3. The combination according to claim 1 wherein said operating member is a rod.

4. The combination according to claim 1 characterized by a safety latch assembly carried by said connecting means for preventing said connecting means from disconnecting said pipe unless said valve is closed.

5. The combination according to claim 4 characterized by said connecting means having link means pivotally carried by said housing, and said safety latch assembly comprising latch means pivotally carried by said link means, said operating member having clearance means at a predetermined position therealong for clearing said latch means when said operating member has closed said valve.

6. The combination according to claim 5 characterized by said clearance means being a recessed area on said operating member.

7. The combination according to claim 1 characterized by said second end of said pipe having means extending transversely thereof and said connecting means comprising means engagable with said transversely-extending means for holding said second end of said pipe in said housing.

8. The combination according to claim 7 characterized by said transversely-extending means being at least one lug.

9. The combination according to claim 8 characterized by said housing having a notch receiving said lug.

10. The combination according to claim 7 characterized by said transversely-extending means comprising at least two lugs on said second end of said pipe and said connecting means comprising at least two hook means engagable with said lugs.

11. The combination according to claim 7 characterized by said transversely-extending means comprising said second end of said pipe being expanded and forming a shoulder with the remainder of the pipe.

12. The combination according to claim 7 characterized by said transversely-extending means comprising said second end of said pipe having a tapered collet thereon received in said housing with lugs engagable by said engagable means.

13. A coupling for being connected to a lance pipe through which oxygen is passed into molten metal in a container, with the pipe being moveable longitudinally by feed means along a predetermined path, said coupling comprising a housing for receiving an end of the pipe, means carried by said housing for connecting said housing to said pipe, said connecting means being moveable between a first position in which said housing is connected to the pipe and a second position in which the pipe is releaseable from said housing, said housing moving with said pipe when connected thereto, a valve operating means connected with said valve for opening and closing said valve, said operating means being moveable between a first position in which said valve is open and a second position in which said valve is closed, said valve being connected with an end of said housing opposite the end which receives the lance pipe, for supplying oxygen through the housing to the lance pipe when the valve is open, an operating member moveably carried by said coupling and moveable rearwardly toward said valve-operating means from a forward position when engaging a stationary object near the feed means as the pipe is moving along the predetermined path, said operating member having means for engaging said valve-operating means when moving rearwardly to move said valve-operating means from the first position to the second position to close said valve, and for subsequently engaging said connecting means for moving said connecting means from its first position to its second position for releasing the pipe from said housing when said valve is closed.

14. A coupling according to claim 13 characterized by a safety latch carried by said coupling for preventing said connecting means from disconnecting said pipe when said valve is open.

15. A coupling according to claim 14 characterized by said safety latch having means engagable with said operating member to prevent movement of said connecting means until said operating member is moved in the rearward direction to a predetermined position.

16. In combination, a lance pipe moveable along a path, an end portion of said pipe having transversely-extending, engageable means, a coupling comprising a housing for receiving the end portion of the pipe, connecting means carried by said housing and moveable between a first position for engaging the transversely-extending means of said pipe for connecting said housing to said pipe and a second position spaced from said transversely-extending means for enabling said housing to be released from said pipe, said housing moving with said pipe when connected thereto, an operating member moveably carried by said housing and moveable in a direction rearwardly relative to said coupling and said pipe when said operating member engages a stationary object located in a predetermined position as it moves with said pipe and said coupling along the path, a valve moveable with said housing and controlling the flow of fluid through said pipe, operating means connected to said valve and moveable between a first position in which said valve is open and a second position in which said valve is closed, said operating member having means for engaging said operating means for moving said operating means from the first position to the second position to close said valve when the pipe is in a predetermined position along the path, and said operating member having means for engaging said connecting means for moving said connecting means from the first position to the second position for releasing said connecting means from the transversely-extending means when the pipe is in a predetermined position along the path.

17. The combination according to claim 16 characterized by said transversely-extending means comprising at least two lugs on said end portion of said pipe and said engaging means comprising at least two hook means engagable with said lugs.

18. The combination according to claim 17 characterized by said lugs being on a collet clamped on said end portion of said pipe.

19. The combination according to claim 16 characterized by said transversely-extending means comprising said end portion of said pipe being expanded and forming a shoulder with the remainder of the pipe.

20. The combination according to claim 16 characterized by said engaging means having link means pivotally carried by said housing, and a safety latch assembly comprising latch means pivotally carried by said link means, said operating member having clearance means at a predetermined position therealong for clearing said latch means when said operating member is in a predetermined position.

* * * * *